United States Patent [19]
Miller

[11] 3,812,425
[45] May 21, 1974

[54] METHOD AND APPARATUS FOR DETERMINATION OF HEMATOCRIT
[75] Inventor: Jack Miller, Parsippany, N.J.
[73] Assignee: Becton, Dickinson and Company, East Rutherford, N.J.
[22] Filed: Nov. 21, 1972
[21] Appl. No.: 308,529

[52] U.S. Cl. .......................... 324/71 CP, 235/95 PC
[51] Int. Cl. ............................................ G01n 27/00
[58] Field of Search............ 324/71 CP; 235/92 PC; 73/432 PS

[56] References Cited
UNITED STATES PATENTS

| | | | |
|---|---|---|---|
| 3,757,213 | 9/1973 | Coulter et al. | 324/71 CP |
| 3,473,010 | 10/1969 | Bloomfield et al. | 235/184 |
| 3,733,548 | 5/1973 | Coulter et al. | 324/71 CP |
| 3,699,319 | 10/1972 | Berg | 235/151.34 |
| 3,439,267 | 4/1969 | Coulter et al. | 324/71 CP |
| 3,231,815 | 1/1966 | Spencer | 324/71 CP X |

Primary Examiner—Alfred E. Smith
Assistant Examiner—Rolf Hille
Attorney, Agent, or Firm—Kane, Dalsimer, Kane, Sullivan and Kurucz

[57] ABSTRACT

A diluted blood sample is passed through a blood cell sensor of the type that provides an electric pulse having a peak amplitude corresponding to the volume of each sensed blood cell and a pulse width corresponding to the instantaneous flow rate of the blood sample through the sensor. The pulse amplitude is monitored and when the pulse peak is sensed, a signal corresponding to the pulse peak amplitude is stored and provided to a gate. A predetermined portion of the pulse width is detected and a signal having a width corresponding to the predetermined portion of the pulse width is provided to control the gate so that the gate passes the signal corresponding to the pulse peak amplitude only during the predetermined portion of the pulse width. The signal passed by the gate is integrated during a specified count period to develop an analog signal corresponding to hematocrit.

15 Claims, 3 Drawing Figures

METHOD AND APPARATUS FOR DETERMINATION OF HEMATOCRIT

BACKGROUND OF THE INVENTION

1. Field of the Invention

The present invention relates to a method and apparatus for determining hematocrit and more particularly to a method using pulse integration for determining hematocrit without the need for volume measurements.

2. Description of the Prior Art

Hematocrit is defined as the volume of packed red cells or the percentage of volume of red cells in whole blood. Heretofore, hematocrit determinations were made by centrifuging the blood so that the red blood cells became packed at one end of a sample tube and the volume of the packed red blood cells was compared with the total volume of the blood sample. In a more sophisticated method for determining hematocrit, a red blood cell count was made and the mean corpuscular volume (MCV) was determined after which the blood cell count was multiplied by the MCV to determine hematocrit. With this method, it was essential that the red blood cell count be extremely accurate and the volume of blood sample precisely controlled.

Precise volume measurement was difficult to achieve especially when small samples were used because inherent errors could not be averaged out to reduce the percentage error. Attempts to measure volume by controlling flow rate over a timed period met with less success because of the greater difficulty associated with maintaining a known flow rate, especially where the sample was small, a flow rate error could not be averaged out.

Thus, some prior art devices were subject to error because of errors associated with volume measurements. Other devices reduced the volume measurement errors to an acceptable level by adding expensive volume measuring equipment that increased the cost of the devices to a level that made their use by individual doctors and small laboratories prohibitive. The volume measuring equipment also increased the size and complexity of the devices thereby increasing the maintenance costs and down time required for maintenance.

SUMMARY OF THE INVENTION

The present invention contemplates a method and apparatus for determining hematocrit that is both automated and is independent of blood sample volume. The method may be used with blood cell sensors of the type that provide electrical cell pulses having peak amplitudes corresponding to the volume of the blood cells and pulse durations corresponding to the instantaneous flow rate of the blood sample through the sensor. The sensor may be similar to the sensor utilized and described in the commonly assigned copending U.S. Pat. applications, Ser. No. 275,864 of Keith Watson and Edward J. Rapoza and U.S. Pat. Ser. No. 278,422 of Daniel W. McMorris and William J. Skidmore III, which provide a pulse for each red cell passing through an aperture. In such a sensor, the peak amplitude of each cell pulse corresponds to the volume of the sensed blood cell and the cell pulse duration corresponds to the instantaneous flow rate of the blood sample through the aperture.

When the sample volume is known, hematocrit may be determined by measuring the total volume of the cells. If the sample flow rate is known, hematocrit may be determined by measuring the total blood cell volume over a precise period of time. Since an aperture-type sensor provides a cell pulse having a peak amplitude corresponding to cell volume, the total cell volume may be determined by integrating pulses having constant amplitudes corresponding to the peak amplitudes of the cell pulses and a constant pulse width. However, since the sample volume is not known and the flow rate varies, a compensating factor corresponding to instantaneous flow rate must be inserted. Since the cell pulse width corresponds to the instantaneous flow rate of the sample, the information contained in the cell pulse width may be used to compensate for flow rate or volume variations. A signal corresponding to the cell pulse width is used to compensate for volume and flow rate variations and to provide a hematocrit determination that is volume and flow rate independent.

The present device monitors the cell pulses and signals having amplitudes corresponding to the peak amplitudes of the cell pulses. The peaks and the half-pulse peak levels of the trailing edges of the cell pulses are detected and the peak amplitude signals are gated during the intervals between the peaks and the half-pulse peak levels of the cell pulses to provide pulses having width corresponding to the widths of the cell pulses.

The gated pulses are integrated during a precisely repeatable count period to provide an analog signal corresponding to hematocrit. The hematocrit signal is independent of blood sample flow rate and blood sample volume. Flow rate independence is achieved for both short and long periods as distinguished from the prior art where flow rate independence was accomplished only over the long periods because of the averaging effect.

Thus, the present invention eliminates the need for expensive volume measuring equipment and thereby substantially reduces the cost, size and complexity of the device.

The primary objective of the present invention is to provide a method and apparatus for electronically determining hematocrit.

Another objective of the present invention is to provide a device for determining hematocrit that is independent of sample volume or sample flow rate.

Another objective of the present invention is to provide a device for determining hematocrit that is less expensive and less complex than those heretofore provided.

The foregoing objectives and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustrative purposes only and are not to be considered as defining the limits of the invention.

DESCRIPTION OF THE INVENTION

Figure 1:
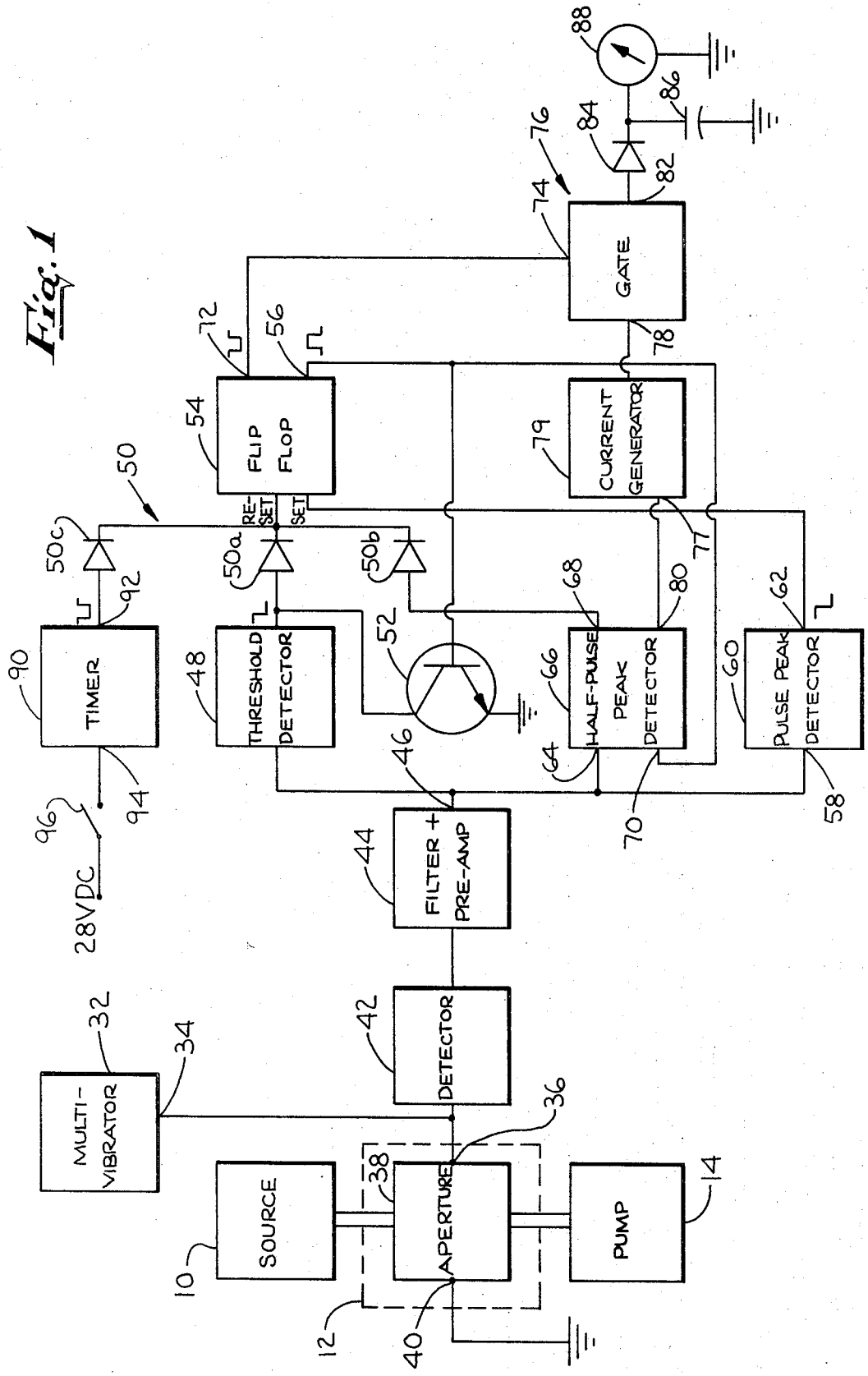
FIG. 1 is a detailed block diagram of the present invention.

Referring to FIG. 1, there is shown a block diagram of the present invention. A source 10 contains a supply of diluted blood sample which is connected to a sensor 12 through which the blood sample is drawn under the influence of a pump 14. Sensor 12 must be of the type that provides an electrical cell pulse for each detected blood cell, said cell pulse having a peak amplitude corresponding to the volume of the blood cell passing through the sensor and the width of the cell pulse corresponding to the instantaneous flow rate of the sample through the sensor. Examples of such sensors are described in copending U.S. Pat. application, Ser. No. 275,864, of Edward J. Rapoza and Keith Watson, where both aperture and photoelectric type sensors are shown.

A multivibrator 32, having an output 34, provides a squarewave signal at a frequency of about 330 KHz and a 20 volt peak to peak. Output 34 is connected to an electrode 36 of a sensor 12 having an aperture 38. Sensor 12 has a second electrode 40 connected to ground. As the blood sample is passed through aperture 38, the impedance across the electrodes 36 and 40 changes when blood cells pass through the aperture. The changes in impedance cause the signal from multivibrator 32 to be modulated. The modulated signal is directed to a detector 42, which function as a demodulator and amplifier to provide a rectified signal to a low-pass filter and preamplifier 44 which eliminates the rf component of the signal and provides an amplified signal at an output 46.

Figure 2:
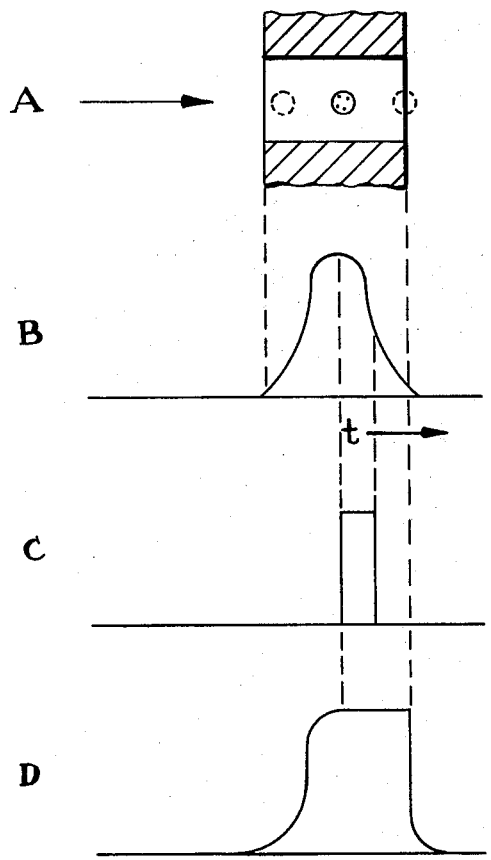
FIG. 2 shows the wave forms of pulses at various outputs of FIG. 1.

Referring to FIG. 2A, there is shown a cut away sectional view of an aperture with a blood cell passing therethrough. in FIG. 2B, there is shown a waveform at output 46 as the cell passes through the aperture of FIG. 2A. The peak of the cell pulse in FIG. 2B has an amplitude corresponding to the volume of the blood cell passing through the aperture and the cell pulse width corresponds to the flow rate of the sample passing through the aperture.

The output from filter-preamplifier 44 includes, in addition to the cell pulses, noise and other low level pulses that do not represent blood cells. It is essential that the device of the present invention only react to cell pulses; therefore, a threshold detector is provided to prevent the device from processing pulses below a certain threshold level. Output 46 is connected to an input of the threshold detector 48, which normally provides a positive or logic level one signal but provides a negative or zero level output, which is defined as logic level zero, when a specified threshold voltage is exceeded. The threshold detector includes means for adjusting the threshold voltage level to an optimum value depending on the type of blood being processed, particularly if other than normal human blood or animal blood is being passed through the aperture.

The output of the threshold detector is connected to a diode 50a of an OR gate 50 and also to the collector of a transistor 52. The output of OR gate 50 is connected to a "reset" input of a flip flop 54. When the threshold detector does not receive a signal exceeding the threshold level, it provides a logic level one signal, to the OR gate. The logic level one signal is passed to the reset input of flip flop 54 to hold flip flop 54 in its reset state, thereby disabling the effect of a signal at the set input of flip flop 54 on an output 56 of the flip flop. The reset input of flip flop 54 has priority over the set input for controlling output 56.

Output 46 of filter-preamplifier 44 is also connected to an input 58 of a pulse peak detector 60 which has an output 62 that provides a signal that changes from a logic level one to a logic level zero when the pulse peak occurs. Output 62 of the peak detector is connected to the set input of flip flop 54 which is responsive to a logic level zero signal to set the flip flop if it is not disabled by the presence of a logic level one signal at the reset input. Peak detector 60 is similar to the peak detector described in the copending U.S. Pat. application, Ser. No. 278,422, previously mentioned.

Output 46 is also connected to an input 64 of a half-pulse peak detector 66, which has an output 68 that normally provides a logic level zero signal to a diode 50b of OR gate 50 and changes to a logic level one signal when the trailing edge of a cell pulse decreases to a level equal to one-half the peak level of the cell pulse. Thus, a logic level one signal from the half-pulse peak detector causes flip flop 54 to reset if it is in the set state.

It is to be understood that the half-pulse peak detector could be set to detect any fraction of the peak voltage but that one-half was chosen for convenience. Likewise, detecting the pulse peak was also chosen for convenience since it is relatively easy to detect the peak of a pulse as compared with other portions of the pulse.

Output 56 of flip flop 54 is connected to the base of transistor 52 and to a second input 70 of the half-pulse peak detector 66 for providing a logic level one signal thereto when said flip flop is in the set state and a logic level zero signal when the flip flop is in the reset state. The second input 70 of half-pulse peak detector 66 is responsive to a logic level zero signal for causing the half-pulse peak detector to receive and track a cell pulse being received from output 46 and is responsive to a logic level one signal for blocking the cell pulse from output 46 and storing the peak level of the cell pulse.

The presence of the logic level one signal on a base of transistor 52 causes it to turn on and clamp the output of threshold detector 48 at a logic level zero when the flip flop is in the set state. If a pulse peak should just slightly exceed the threshold level of threshold detector 48, the threshold detector output will remain at a logic level zero even when the trailing edge of the pulse declines below the threshold level and flip flop 54 will remain in the set state until the trailing edge of the pulse decreases to a value equal to one-half the pulse peak. Thus, the flip flop remains in a set state for a period of time corresponding to the cell pulse width rather than being dependent upon the absolute level of the cell pulse. Without the clamping action of transistor 52, the threshold detector would reset the flip flop as soon as the trailing edge of the cell pulse declined to a level below the threshold level.

Flip flop 54 has an output 72 which is connected to a control input 74 of a gate 76 which is responsive to a zero level signal from output 72 to pass signals received at its input 78. Half-pulse peak detector 66 has an output 80 which is connected to an input 77 of a current generator 79 for providing signals corresponding to the peak amplitudes of the cell pulses received from output 46. Current generator 79 in response to the signals from output 80 provides a current signal to input 78 of gate 76 corresponding to the peak amplitudes of the cell pulses. Gate 76 has an output 82 connected to an anode of a diode 84, which has a cathode connected to one side of a storage capacitor 86, the other side of which is connected to ground. The cathode of diode 84 is also connected to the input of a meter 88, which provides an indication corresponding to an analog voltage developed on capacitor 86.

It is required that cell pulses be accumulated only during a precisely repeatable period; therefore, a count period timer 90 is provided having an output 92, which normally provides a logic level one signal and is connected to a diode 50c of OR gate 50. The logic level one signal from count period timer 90 holds flip flop 54 in the reset state, thereby disabling the flip flop. The count period timer has an input 94 connected to a 28 volt dc source through a normally open switch 96. Switch 96 is closed to initiate a count period and in response to the closing of switch 96, timer 90 provides a negative or logic level zero output signal for a precisely repeatable count period of approximately 10 seconds. During this count period, the logic level one signal is removed from the reset input of flip flop 54 so that the peak detector output signal may drive flip flop 54 into the set state when a cell pulse is detected. Flip flop 54 remains in the set state until the trailing edge of the cell pulse decreases to a level equal to one-half the cell pulse peak. After the count period has terminated, the output 92 of count period timer 90 again provides a logic level one signal thereby disabling flip flop 54. Thus, flip flop 54 may only be toggled to the set state during the precisely repeatable count period and the capacitor 86 may only accumulate charges during this count period.

By integrating the pulses during a precisely repeatable count period, the device becomes flow rate and volume independent as fully described in the previously mentioned copending patent applications. Flow rate compensation is accomplished by controlling gate 76 so that it passes the signals from the current generator only during a predetermined portion of the cell pulses, namely during the intervals between the pulse peaks and half-pulse peak levels. When the sample flow rate increases, the pulse width decreases in corresponding relationship; however, the total number of cells passing through the sensor also increases in corresponding relationship so that the analog voltage developed by the integrator remains the same for a predetermined count period.

Upon initial calibration of meter 88, an assayed blood sample is passed through the aperture and the meter reading is adjusted to the assayed value. Thus, the meter is calibrated to a known hematocrit and remains calibrated for subsequent determinations with unknown samples.

Figure 3:
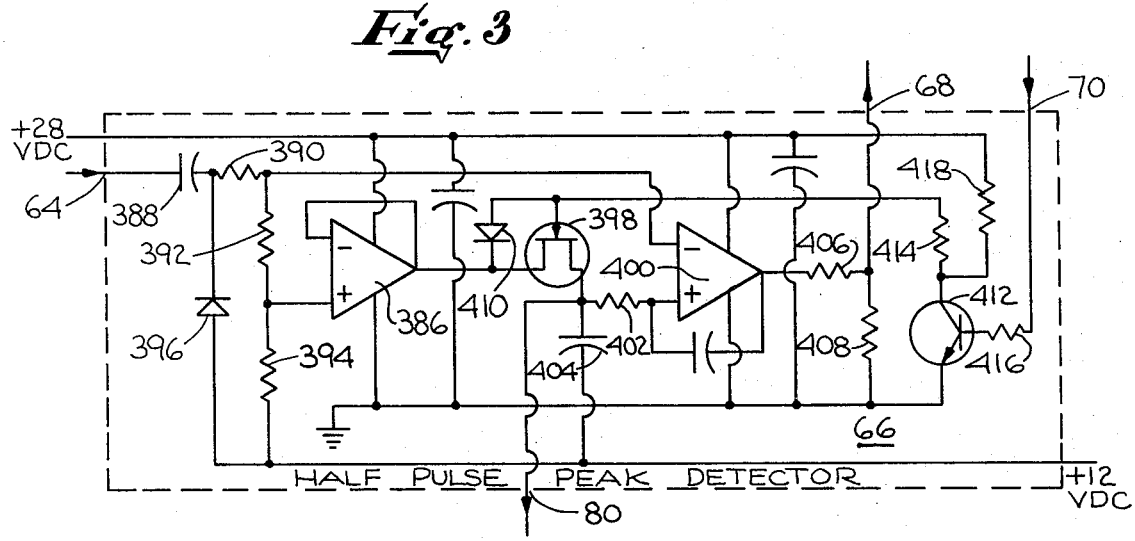
FIG. 3 is a schematic diagram of a half-pulse peak detector used in the present invention.

Referring to FIG. 3, there is shown a schematic diagram for the half-pulse peak detector 66. Half-pulse peak detector 66 is similar in design and operation to one described in copending U.S. Pat. application, Ser. No. 278,442. The half-pulse peak detector used in the present invention has been modified to the extent that it includes another output 80 connected to the drain of field effect transistor 398.

When flip flop 54 is in the reset state, the logic level zero signal from output 56 causes transistor 412 to be turned off so that +28 volts is impressed on the gate of field effect transistor 398 causing it to be turned on. When transistor 398 is turned on, the output of amplifier 396 is connected to capacitor 404. Resistors 390, 392 and 394 form a voltage divider so that the junction of resistors 390 and 392 has a voltage equal to one-half of the input voltage and the junction between resistors 392 and 394 has a voltage equal to one-quarter of the input voltage. Thus, the noninverting input of amplifier 386 receives a voltage equal to one-quarter the input voltage and provides at its output a voltage equal to one-quarter the input voltage since the amplifier has a gain of one. This voltage charges capacitor 404 when transistor 398 is turned on so that the capacitor voltage tracks the input voltage in corresponding relationship. The inverting input of amplifier 400 receives a voltage equal to one-half the input voltage so that amplifier 400 provides a zero or negative output when field effect transistor is conducting. When flip flop 54 is toggled to the set state, by peak detector 60, the logic level one signal from the output 56 causes transistor 412 to be turned on, thereby removing the positive dc voltage from the gate of field effect transistor 398 causing the field effect transistor to effectively open leaving capacitor 404 charged with a voltage equal to one-fourth the peak level of the input pulse. This voltage appears at output 80 and corresponds to the peak amplitude of the cell pulses. Amplifier 400 continues to provide a zero or negative output, while the trailing edge of the input pulse decreases until the half-pulse peak is reached, at which time, the inverting input of amplifier 40 receives a voltage equal to the voltage stored on capacitor 404, which is equal to one-fourth the peak voltage. The output of amplifier 400 abruptly changes state to a positive level signal indicating that the half-pulse peak has been reached. This output then resets for flip flop 54 causing the output 72 of flip flop 54 to provide a one level signal, thereby turning off gate 76 and stopping the charging current to capacitor 86 from current generator 79.

The signal provided at output 80 of the half-pulse peak detector 66 has a wave shape similar to that shown in FIG. 2D, wherein the signal increases until the peak level of the input pulse is reached, after which the signal remains constant until the flip flop is reset. Thus, the signal provided to gate 76 has an amplitude corresponding to the peak amplitude of each sensed cell pulse.

It will be immediately apparent to those skilled in the art that there are several ways of providing signals corresponding to the peak amplitude and width of the cell pulses. The previously described embodiment is preferred because of its compatibility with other previously developed instruments.

The present invention teaches a method and apparatus for determining hematocrit that are truly independent of blood sample volume and flow rate. This independence is achieved through the use of pulse width information and integrating techniques to provide an analog signal corresponding to hematocrit. Since volume measurement and flow rate need no longer be precisely controlled, the device taught by the present invention is less expensive and complex than those heretofore provided. Thus, the present invention teaches a device that is practical for use in individual doctor's offices and small laboratories.

What is claimed is:

1. A method for determining the hematocrit of a diluted blood sample, comprising the steps of:
   sensing the blood cells contained in the diluted blood sample by passing the sample through a sensing means;
   providing an electric pulse output for each sensed blood cell, each output pulse having a peak amplitude corresponding to the volume of the sensed blood cell and width corresponding to the instantaneous flow rate of the sample through the sensing means;
   sensing a predetermined portion of each output;
   modifying each output to have a duration corresponding to the sensed predetermined portion of the output; and
   integrating the modified output during a precisely repeatable period of time to provide an output corresponding to hematocrit.

2. A method as described in claim 1, wherein the step of modifying each output includes the step of gating the output during the predetermined portion of the output.

3. A method as described in claim 2, additionally comprising the step of providing a signal during the sensed predetermined portion of each output, said gating being in response to the signal.

4. A method as described in claim 1, wherein the peak level of the output corresponds to blood cell volume, additionally including the steps of:
   providing an amplitude signal for each output, said amplitude signal having an amplitude corresponding to the output peak amplitude;
   modifying each amplitude signal to have a duration corresponding to the sensed predetermined portion of the associated output; and
   integrating the modified amplitude signals during a precisely repeatable period of time to provide an output corresponding to hematocrit.

5. A method as described in claim 1, wherein the step of sensing the predetermined portion of each output comprises the steps of:
   detecting the peak level of each output; and
   detecting when the trailing edge of the output decreases to a level equal to a predetermined fraction of the peak level of the output.

6. A method as described in claim 1, wherein the first mentioned step comprises the steps of:
   passing the blood sample through an aperture;
   applying an electronic signal across the blood sample in the aperture; and
   detecting changes in signal level caused by the passage of blood cells through the aperture and forming pulses corresponding to the changes in signal level, said pulses having peak amplitudes corresponding to blood cell volumes and durations corresponding to the instantaneous flow rate of the blood sample through the aperture.

7. An instrument for determining the hematocrit of a diluted blood sample, comprising:
   sensing means for sensing blood cells in the diluted blood sample and for providing an output for each sensed blood cell, said output having an amplitude corresponding to blood cell volume and a duration corresponding to the instantaneous flow rate of the blood sample through the sensing means;
   means for passing the blood sample through the sensing means;
   means for detecting a predetermined portion of each output;
   means responsive to the detecting means for providing modified output signals having durations corresponding to the predetermined portion of the outputs; and
   means for integrating the modified output signals over a precisely repeatable period of time to provide an output corresponding to hematocrit.

8. An instrument for determining the hematocrit of a diluted blood sample, as described in claim 7, wherein the sensing means comprises:
   an aperture;
   means for passing the blood sample through the aperture;
   means for applying an electronic signal across the blood sample in the aperture; and
   means for detecting modulation of the electronic signal and for forming pulses corresponding to the modulation which results from a change in resistance across the blood sample in the aperture as blood cells pass through the aperture, said pulses having a peak amplitude corresponding to the volume of the blood cells sensed and a duration corresponding to the instantaneous flow rate of the blood sample through the aperture.

9. An instrument for determining the hematocrit of a diluted blood sample as described in claim 7, wherein the means for providing modified output signals comprises a gate means for passing the output during a period of time corresponding to the predetermined portion of the output.

10. An instrument for determining the hematocrit of a diluted blood sample as described in claim 7, wherein the means for detecting the predetermined portion of each output includes, detector means for detecting the output peaks and levels of the trailing edges of the outputs equal to a specified fraction of the output peak levels and for providing a duration signal during the intervals between the output peaks and the specified fraction of the output peak.

11. An instrument for determining the hematocrit of a diluted blood sample as described in claim 10, wherein the means for providing modified output signals is a gate means responsive to the duration signals for passing the output when a duration signal is present.

12. An instrument for determining the hematocrit of a diluted blood sample as described in claim 7, additionally comprising:
   a peak detector means for providing a pulse when the output peak occurs; and
   output tracking means for tracking the output and for storing the output signal level in response to the pulse from the peak detector means so as to provide an amplitude signal corresponding to the output peak amplitude.

13. An instrument for determining the hematocrit of a diluted blood sample, comprising:
   sensing means for sensing blood cells contained in the diluted blood sample and for each sensed blood cell providing an output pulse having a peak amplitude corresponding to the cell volume and a duration corresponding to the instantaneous flow rate of the diluted blood sample through the sensing means;

means for passing the blood sample through the sensing means;

means responsive to the output pulses for detecting when the pulse peaks occur and for providing signals in response thereto;

means responsive to the signals from the pulse peak detecting means and the last mentioned means and for providing an output during the interval between said signals;

gating means responsive to the output from the last mentioned means for passing the signals corresponding to the amplitudes of the pulse peaks; and integrating means for integrating the signals passed by the gating means over a precisely repeatable period of time so that a voltage corresponding to hematocrit is developed.

14. A method for determining the hematocrit of a diluted blood sample, comprising the steps of:

sensing the blood cells contained in the diluted blood sample by passing the sample through a sensing means;

providing an output for each sensed blood cell, each output having a peak altitude corresponding to the cell volume and a width corresponding to the instantaneous flow rate of the sample through the sensing means;

providing a signal for each output, said signal corresponding to the peak amplitude of the output and a portion of the width of the output; and integrating the signals during a precisely repeatable period of time to provide an output corresponding to hematocrit.

15. An instrument for determining the hematocrit of a dilute blood sample, comprising:

sensing means for sensing blood cells in the diluted blood sample and for providing an output for each sensed cell, said output having a peak amplitude corresponding to blood cell volume and a width corresponding to the instantaneous flow rate of the blood sample through the sensing means;

means for passing the blood sample through the sensing means;

means responsive to the output of the sensing means for providing a signal for each output, said signal corresponding to the peak amplitude of the output and a portion of the width of the output; and means for integrating the signals over a precisely repeatable period of time to provide an output corresponding to hematocrit.

* * * * *